June 18, 1968  J. M. PETERSON ET AL  3,388,878
VTOL AIRCRAFT WITH BALANCED POWER, RETRACTIBLE
LIFT FAN SYSTEM
Filed June 1, 1965  5 Sheets-Sheet 1
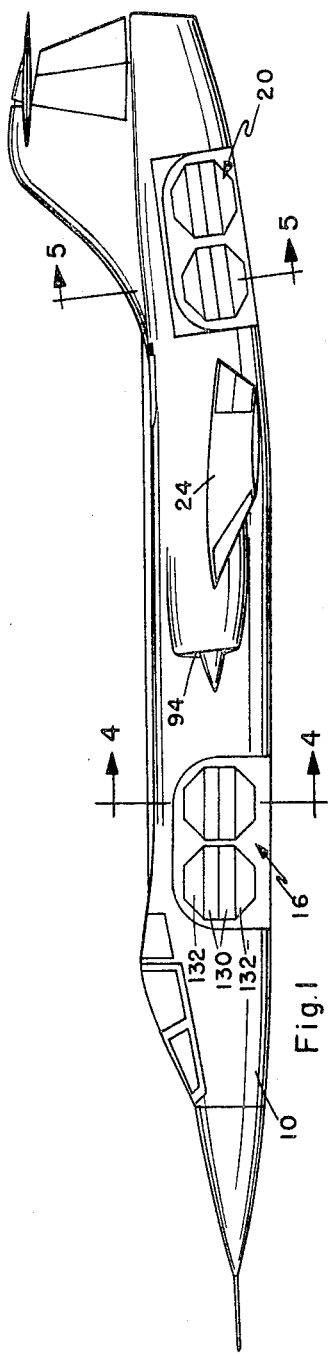
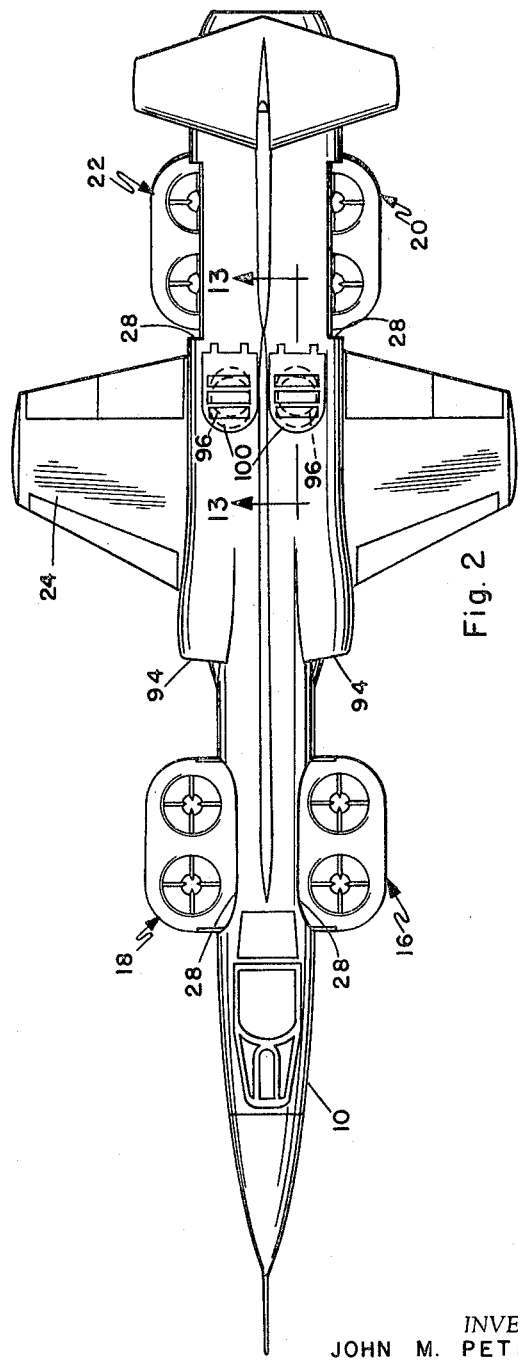
INVENTORS
JOHN M. PETERSON
WALDO VIRGIL OPFER, JR.
BY
Knox & Knox June 18, 1968   J. M. PETERSON ET AL   3,388,878
VTOL AIRCRAFT WITH BALANCED POWER, RETRACTIBLE
LIFT FAN SYSTEM
Filed June 1, 1965   5 Sheets-Sheet 2
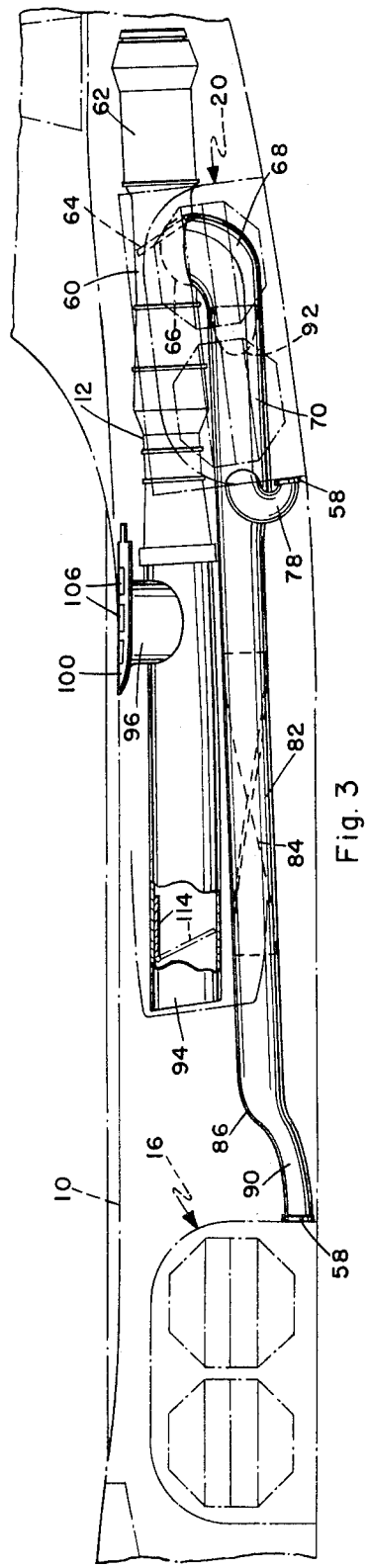
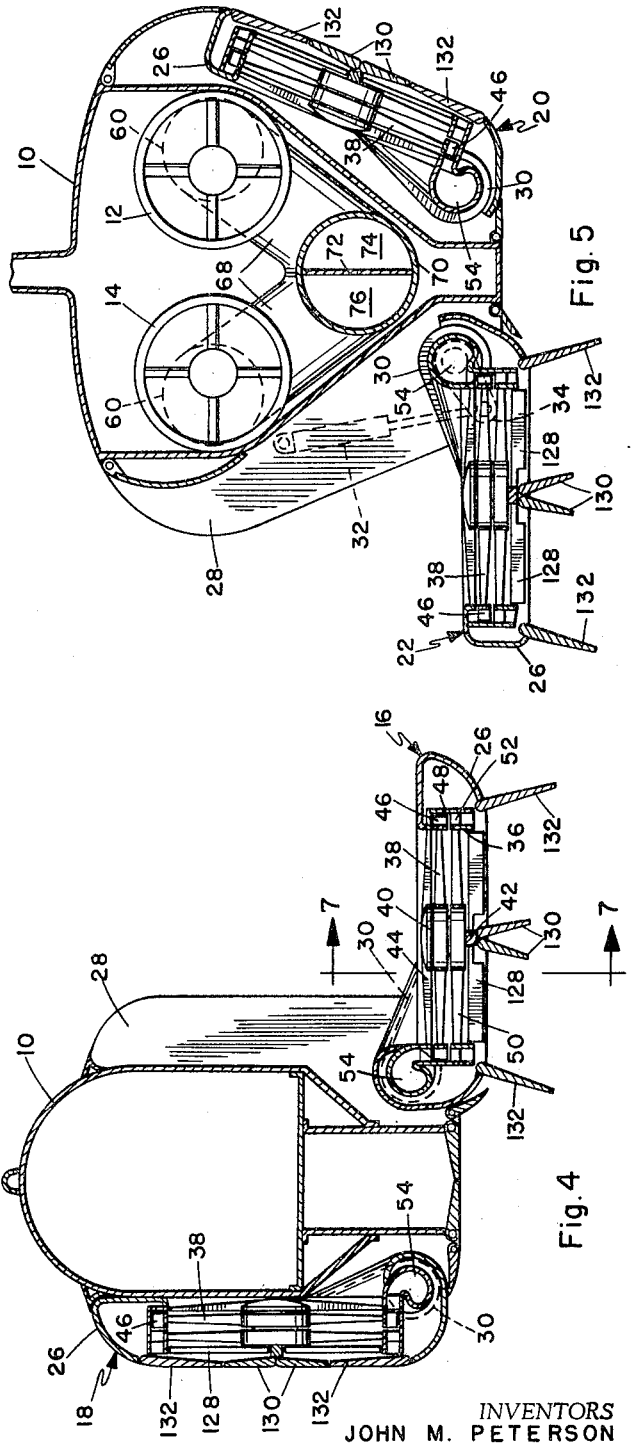
INVENTORS
JOHN M. PETERSON
WALDO VIRGIL OPFER, JR.
BY
Knox & Knox June 18, 1968  J. M. PETERSON ET AL  3,388,878
VTOL AIRCRAFT WITH BALANCED POWER, RETRACTIBLE
LIFT FAN SYSTEM
Filed June 1, 1965  5 Sheets-Sheet 3
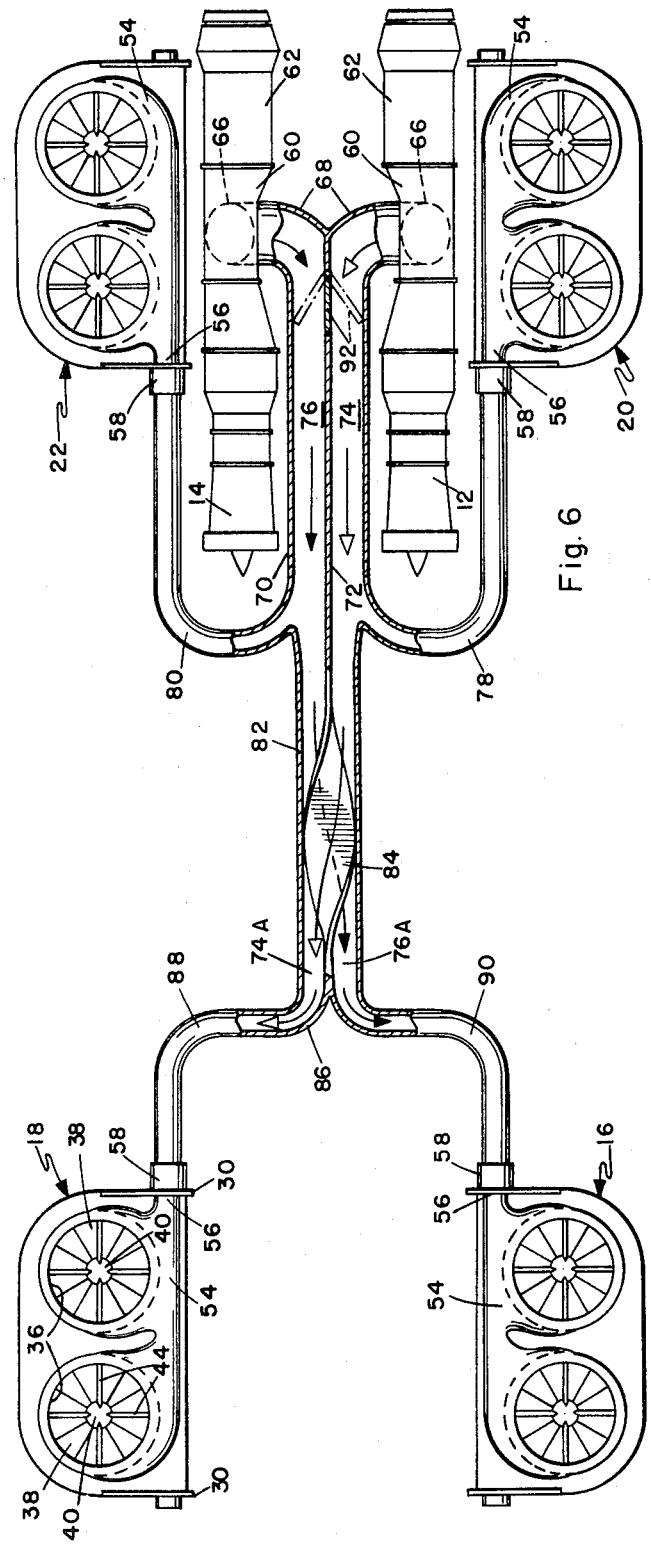
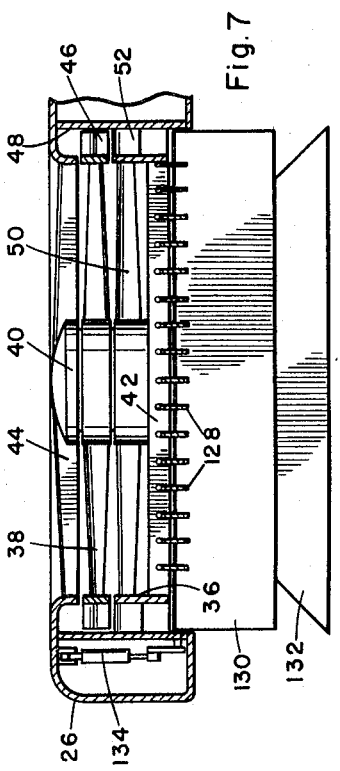
INVENTORS
JOHN M. PETERSON
WALDO VIRGIL OPFER, JR.
BY
Knox & Knox

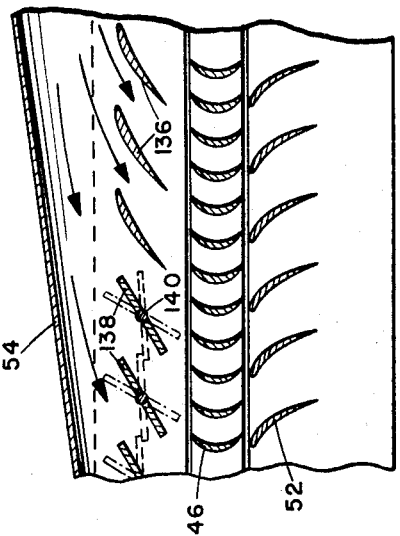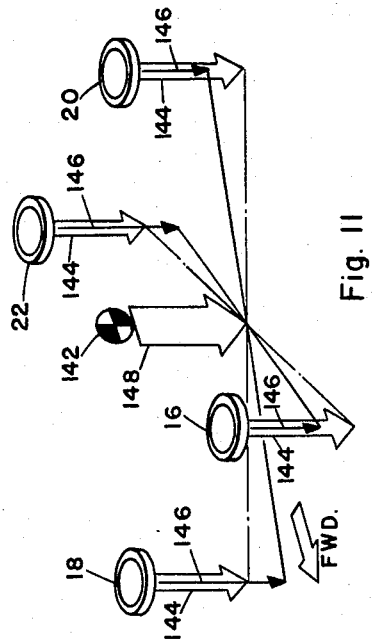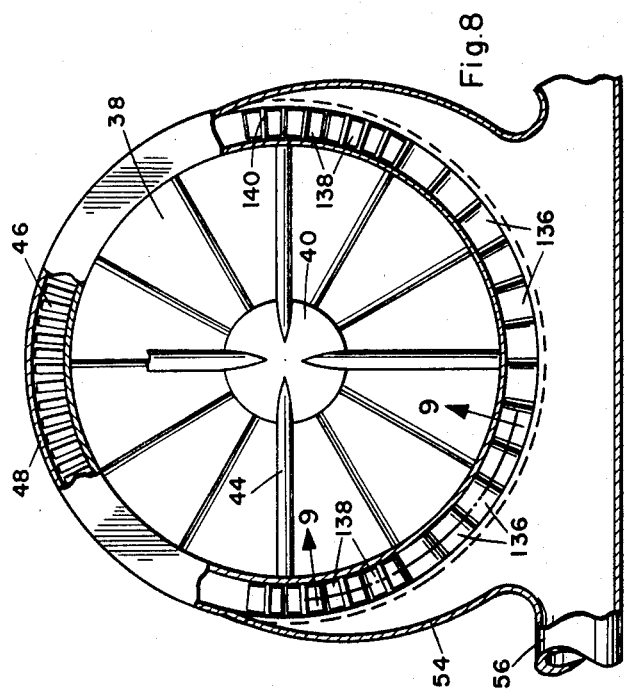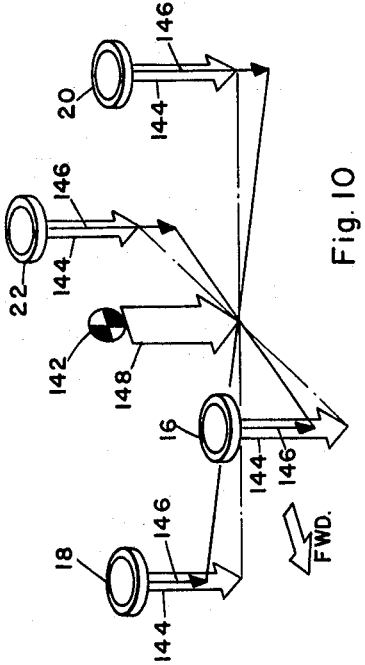

June 18, 1968  J. M. PETERSON ET AL  3,388,878
VTOL AIRCRAFT WITH BALANCED POWER, RETRACTIBLE
LIFT FAN SYSTEM
Filed June 1, 1965  5 Sheets-Sheet 5
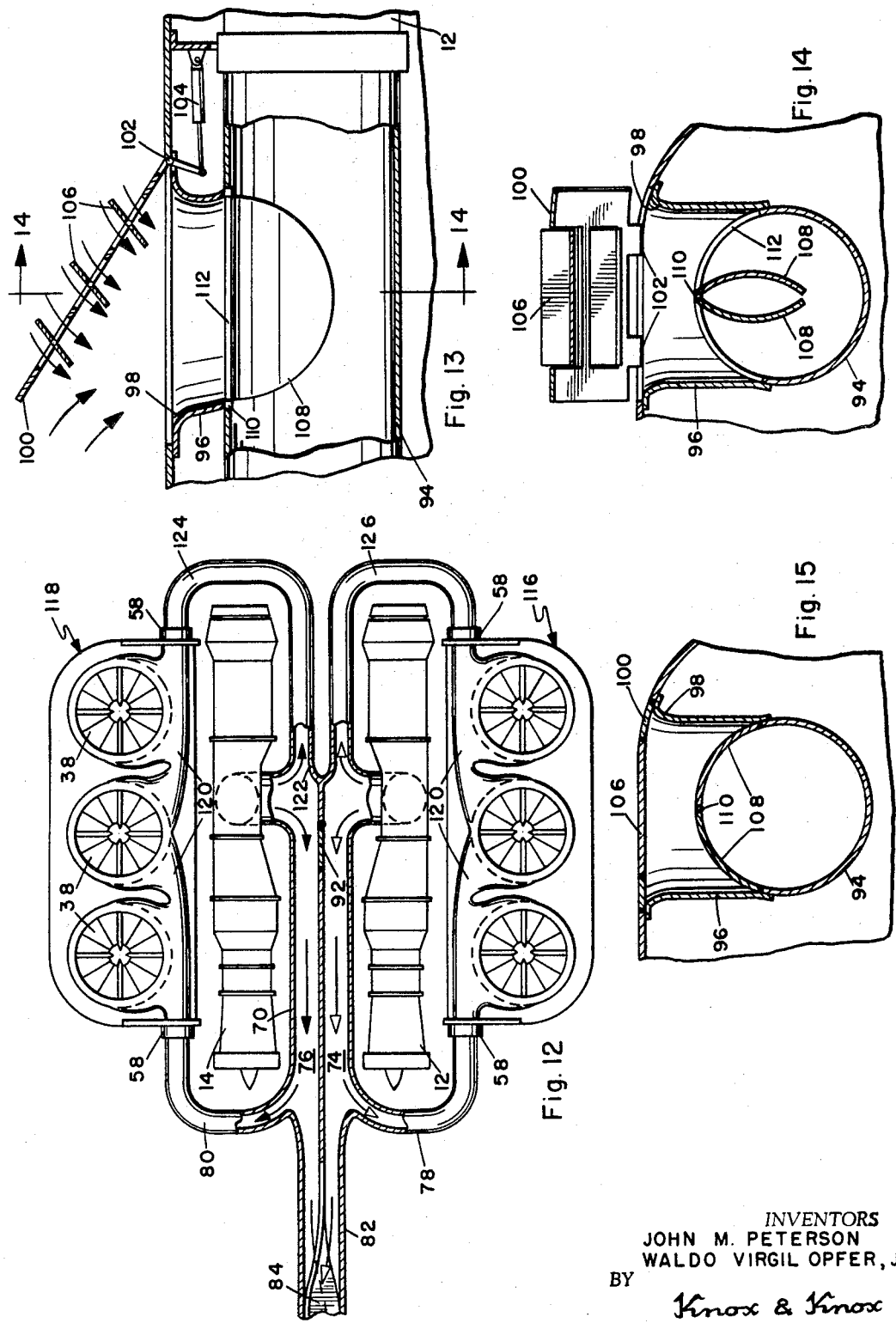
INVENTORS
JOHN M. PETERSON
WALDO VIRGIL OPFER, JR.
BY
Knox & Knox United States Patent Office 3,388,878
Patented June 18, 1968

3,388,878
VTOL AIRCRAFT WITH BALANCED POWER, RETRACTIBLE LIFT FAN SYSTEM
John M. Peterson and Waldo Virgil Opfer, Jr., San Diego, Calif., assignors to The Ryan Aeronautical Co., San Diego, Calif.
Filed June 1, 1965, Ser. No. 459,987
5 Claims. (Cl. 244—23)

ABSTRACT OF THE DISCLOSURE

The VTOL aircraft has a plurality of jet engine driven lift fans interconnected by a balanced power distribution system to ensure constant efficient use of total power and to provide symmetrical lift about the aircraft's center of gravity for stability; in the event of an engine failure the remaining power is still properly distributed to maintain symmetrical lift.

---

The present invention relates to aircraft and more specifically to a VTOL aircraft with a balanced power, retractible lift fan system.

VTOL aircraft require lifting thrust greater than the weight of the aircraft, but this high thrust is used only for take-off and landing, the thrust required to maintain level flight being considerably less. In high speed jet aircraft ducted fans driven by the jet exhaust gases are especially effective for vertical thrust, since properly designed fans can provide from two to four times the effective thrust of the jet engine itself. The jet engine can then be sized to provide adequate power for level flight, which minimizes weight and fuel consumption.

In aircraft using two or more jet engines to drive multiple fans, vairous ararngements of interconnected or multiple gas ducts have been devised to ensure operation of all fans, at reduced power, in the event of an engine failure. In complex ducting, however, some of the fans could be more effectively driven than others, due to unequal flow paths for the gases resulting in unbalanced thrust.

In the vertical flight mode the flow from the various fans is controlled to provide pitch, roll and yaw reactions to stabilize and maneuver the aircraft. A certain fraction of the available power must be used to obtain this control and, to provide a maximum of payload capability, it is desirable to reduce the control power requirement to a minimum. Some present types of ducted fan aircraft use a spoiling technique to throttle the airflow from the fans in order to obtain thrust differential between fans for control. This results in a degrading of thrust and an unbalanced thrust pattern of the fan system.

The primary object of this invention, therefore, is to provide a VTOL aircraft having multiple jet engines driving a set of lift fans through a unique balanced power distribution system to ensure symmetrical lifting thrust about the center of gravity of the aircraft, even in the event of one engine failing.

Another object of this invention is to provide a VTOL aircraft having a power transfer system which permits a full range of control and stabilization by means of the lift fans, without disturbing the balance of thrust or the total thrust of the system.

Another object of this invention is to provide a VTOL aircraft in which the fan system is retractible when not in use to reduce drag, the retraction being made feasible by the very simple power distribution arrangement.

A further object of this invention is to provide a VTOL aircraft wherein the door portions, which cover the fan ducts in the retracted position and form smooth continuations of the aircraft surfaces, act as yaw control means in the vertical flight mode.

Another object of this invention is to provide a lift fan system which is adaptable to a variety of aircraft of different performance characteristics, the system being compact and easily arranged to suit specific airframe structures and layouts.

The fan installation and operation in a typical aircraft is illustrated in the drawings, in which:

FIGURE 1 is a side elevation view of the aircraft with the fans retracted;

FIGURE 2 is a top plan view of the aircraft with the fans extended;

FIGURE 3 is a side elevation view of the power distribution system, portions of the aircraft being indicated in broken line;

FIGURE 4 is an enlarged sectional view taken on line 4—4 of FIGURE 1;

FIGURE 5 is an enlarged sectional view taken on line 5—5 of FIGURE 1;

FIGURE 6 is a schematic layout of the fan and power transfer system;

FIGURE 7 is an enlarged sectional view taken on line 7—7 of FIGURE 4;

FIGURE 8 is a top plan view of a typical fan unit, with portions cut away;

FIGURE 9 is an enlarged fragmentary sectional view taken on line 9—9 of FIGURE 8;

FIGURE 10 is a diagram showing lift distribution of the fans in a pitch action;

FIGURE 11 is a diagram showing lift distribution in a roll action;

FIGURE 12 is a view similar to a portion of FIGURE 6, showing an alternative fan and duct arrangement;

FIGURE 13 is an enlarged fragmentary sectional view taken on line 13—13 of FIGURE 2, with the auxiliary air intake doors open;

FIGURE 14 is a sectional view taken on line 14—14 of FIGURE 13; and

FIGURE 15 is a sectional view similar to FIGURE 14, but with the doors closed.

Similar characters of reference indicate similar or identical elements and portions throughout the specification and throughout the views of the drawing.

Fan system

The aircraft illustrated in FIGURES 1 and 2 is typical of high speed jet aircraft having a long fuselage 10 with rear mounted engine or engines, in this instance a pair of turbojet engines 12 and 14. The fan system shown comprises four lift generating fan units, each containing a pair of lift fans, the units being arranged with a left front unit 16 and a right front unit 18 forward of the wing and a left rear unit 20 and a right rear unit 22 aft of the wing 24. Other arrangements may be used, with single fans or groups of three or more, the primary requirement being symmetry of lifting thrust about the aircraft center of gravity. The fan units are all basically similar, except for dimensional and contour variations in the housing structure to conform to the adjacent airframe structure. For convenience the fan unit 16 will be described in detail, the component parts being applicable to all other units.

The fan unit comprises a box-like housing 26 externally shaped to conform to the contours of the portion of the fuselage in which the unit retracts into a well 28. At the lower end the housing is hinged on a longitudinal axis by hinge members 30 journalled in adjacent fuselage structure at the front and rear ends of the well 28, various hinge arrangements being suitable. A jack 32, or similar linear actuator, is mounted in the fuselage and coupled to an actuating arm 34 connected to one hinge member 30, to extend and retract the fan unit. A typical jack arrangement is indicated for convenience in FIGURE 5. In the retracted position the fan unit is generally upright in the fuselage side and can swing outwardly and downwardly to a horizontal position extending laterally from the fuselage, the two positions being shown in both FIGURES 4 and 5. Each housing 26 contains a pair of circular ducts 36 spaced longitudinally, and in each duct is a lift fan 38 freely rotatably mounted on a central bearing 40 which is supported by a suitable beam 42 and braces 44 across the duct. Fixed to the periphery of each fan 38 is a turbine ring 46 running in an annulus 48 around the duct 36. Below fan 38 are flow straightener blades 50 and below turbine ring 46 is a ring of flow straightening vanes 52, to straighten out the air and gas flow. Above the annulus 48 is a gas distributing scroll duct 54 extending around substantially half the circumference of the annulus, although more or less of the turbine ring 46 can be included in the scroll according to performance requirements. The scroll ducts of both fans in each unit are coupled together and communicate with an inlet duct 56 which enters the fan unit through a rotatable coupling 58 coaxial with one hinge member 30. The basic tip turbine driven ducted fan as described above is well known and may vary in detail, with single fans as shown, or counter-rotating fans in each duct. A typical arrangement is disclosed in U.S. Patent No. 3,179,353 to John M. Peterson, entitled Jet Powered Ducted Fan Convertiplane.

*Power system*

Jet engines 12 and 14 each have a diverter section 60 in the tailpipe 62 thereof, the diverter containing a diverter valve 64 which can swing between a position covering a side outlet 66 and a position blocking tailpipe 62. A similar diverter valve and its operation are disclosed in the above mentioned U.S. Patent No. 3,179,353. When the diverter valve is covering the side outlet, all of the engine exhaust is ejected from the tailpipe for forward propulsion and, when the valve is blocking the tailpipe, the exhaust gases are diverted through the side openings.

From each diverter section 60 a coupling duct 68 extends from the side outlet 66 to a primary duct 70, which is divided longitudinally by a diametrical web 72 to form two separate channels 74 and 76. Engine 12 exhausts only into channel 74 and engine 14 into channel 76. From channel 74 a supply duct 78 leads to the rotatable coupling 58 of fan unit 20, and from channel 76 a similar supply duct 80 leads to the rotatable coupling of fan unit 22. Primary duct 70 extends forward from the supply ducts 78 and 80 into a crossover section 82 in which web 72 has a helical portion 84 which is rotated 180 degrees. Channel 74 is thus transferred from one side to the other and is identified as channel 74A, channel 76 being similarly transferred and numbered 76A. At the forward end of crossover section 82 is a bifurcated portion 86 with a supply duct 88 leading from channel 74A to the rotatable coupling 58 of fan unit 18 and a supply duct 90 leading in a similar manner from channel 76A to fan unit 16. By means of crossover section 82, engine 12 is coupled to the right front and left rear fan units 18 and 20, while engine 14 is coupled to the left front and right rear fan units 16 and 22. The flow paths are indicated in FIGURE 6 by the different types of directional arrows. Since the fan units in this instance are symmetrically disposed about the center of gravity of the aircraft, this arrangement ensures that any difference in output between the two engines will be balanced and will not cause a thrust differential about the center of gravity. This is especially important in the event of an engine failure, which is provided for by a coupling valve 92 inset in the web 72 adjacent the coupling ducts 68. If one engine fails the coupling valve 92 is swung to one side, as indicated in the broken line positions in FIGURE 6, to block the channel from the inoperative engine. The gases from the remaining engine then pass through the opening of the coupling valve and are distributed to all the fan units. Due to differences in flow and duct losses in this condition the fan units will not receive exactly equal power, but the diagonally coupled pairs of fan units ensure that the thrust will be balanced about the center of gravity. Coupling valve 92 can be operated by the pilot or may be automatically actuated by differential pressure sensing means, as disclosed in U.S. Patent No. 3,154,917, to David Williamson, entiled Diverter for Ducted Fan Aircraft.

In the vertical take-off mode there is little or no ram air flow into the jet engine intakes 94 and for reliability it is necessary to ensure adequate flow to the engines. This is accomplished, as illustrated in FIGURES 13–15, by VTOL intakes 96 in the top of intakes 94, with bellmouth entry portions 98 opening to the top of fuselage 10. Each bellmouth 98 is provided with a cover door 100 pivoted at the rear on hinges 102 and raised and lowered by a jack 104, or similar means. In the door 100 are transverse slats 106, pivotally mounted to be opened by any suitable means, to admit air through the door from the rear, as well as the air entering the bellmouth from the front. Entry into the intake 94 is controlled by a pair of flaps 108 which, when closed, are integral portions of the intake wall, as in FIGURE 15. Flaps 108 are pivotally mounted on a longitudinal hinge 110 at the top of the intake 94 to swing down into the intake and expose an opening 112. The VTOL air flow will make up for any interference between the flow into the forward end of intakes 94 and the flow to the front fan units, although this is not a problem unless the fans are extremely close to the jet intakes. In an aircraft in which the intakes are close to the ground a rest and there is a possibility of ingestion of debris or combustion gases, the intakes 94 may be closed in the VTOL mode by doors 114, as in FIGURE 3, which may operate in conjunction with doors 100. The VTOL intakes 96 would, of course, be large enough to supply all necessary air flow to the engines.

*Alternative fan and power arrangement*

In some instances it may be necessary to use a large number of small fans to fit a particular airframe. The arrangement shown in FIGURE 12 uses fan units 116 and 118, each with three fans, the rear unit being indicated as an example. To improve flow characteristics and gas distribution each fan unit has a pair of rotatable couplings 58, one at each end, each coupling leading to a scroll duct 120 which supplies one end fan and half of the center fan with turbine driving gas. The arrangement of engines 12 and 14, primary duct 70, crossover 82, coupling valve 92 and supply ducts 78 and 80 remains as shown in FIGURE 6, but the rear of said primary duct has a bifurcated portion 122 from which rear supply ducts 124 and 126 extend to the additional couplings 58. Other ducting arrangements can be made to suit specific fan installations.

*Control system*

In the lower portion of each fan duct 36 are deflection vanes 128 extending transversely across the duct and pivoted to swing from front to rear collectively, to deflect fan air flow to the rear to initiate forward motion, or to deflect the air flow forward for braking action. These deflecting vanes are used primarily during transition between horizontal and vertical flight and a suitable actuating arrangement is disclosed in the above mentioned U.S. Patent No. 3,179,353. When not in use the deflection vanes fold flat across the duct.

At the lower end of each duct 36 are cover doors hinged on longitudinal axes, the doors in this instance including a pair of inner doors 130 hinged along opposite sides of beam 42 and a pair of outer doors 132 hinged at opposite sides of the duct. When closed the cover doors completely cover the duct and form integral portions of the outer surface of housing 26, which becomes part of the fuselage side when retracted. In the extended position of the fan units the cover doors are operated by suitable jacks 134, or similar means, and swing down to open the ducts, as in FIGURES 4, 5 and 7. By moving the cover doors from side to side, either collectively or differentially among the fan units, the fan air flow is deflected laterally to impart a yaw motion to the aircraft. Interconnecting and actuating means suitable for this yaw control is contained in a control system disclosed in a copending application for U.S. Patent, Ser. No. 252,965, now U.S. Patent No. 3,204,893, to Herbert J. Shear, et al., entitled Signal Mixing System for Servo Actuators.

In each scroll duct 54 immediately above the turbine ring 46 are stator vanes to direct the exhaust gases to the turbine blades. Part of the stator vanes are fixed vanes 136, as in FIGURES 8 and 9, and part are movable vanes 138 pivoted on radially extending hinges 140. In the neutral position, indicated in solid line in FIGURE 9, the power to all fans is equal and lift is symmetrical, vertical ascent and descent being controlled by the engine throttle mechanism, or suitable primary exhaust flow control means. When the movable vanes 138 are closed, as in the dash line position in FIGURE 9, the gas flow to the turbine ring 46 is decreased and the power of that fan is reduced. Conversely, when the movable vanes are opened, as in the broken line position, the gas flow to the turbine is increased and the fan thrust increases correspondingly.

The movable vanes 138 of the various fan units are interconnected in the same diagonal relationship as the fan units themselves are gas coupled through the crossover ducting, the operating relationship being illustrated diagrammatically in FIGURES 10 and 11. In FIGURE 10, for example, the thrust of fan unit 16 is decreased while the thrust of diagonally opposed fan unit 22 is proportionally increased, the total exhaust gas flow and resultant power being constant. Simultaneously the thrust of fan unit 18 is decreased while the thrust of fan unit 20 is increased. The decrease in thrust forward of the center of gravity 142 and the increase in thrust at the rear results in a nose down pitching moment.

The diagram of FIGURE 11 shows the thrust of fan units 16 and 20 decreased while the thrust of fan units 18 and 22 is increased, resulting in a rolling moment to the left.

In each diagram the neutral or equal lift forces are indicated by outlined arrows 144, with the modified lift forces superimposed as single line arrows 146. The coupled fan units are interconnected through the center of gravity by broken lines in the neutral position and solid lines in the modified thrust position. In each instance it will be apparent that the total thrust 148, effective at the center of gravity, remains constant. Thus there is no unwanted vertical motion during pitch and roll maneuvers. It will be obvious that differential modulation of the movable vanes between pairs of fan units will provide combined pitch and roll reactions. The movable vanes 138 can also be controlled by means corresponding to a portion of the control system disclosed in the above mentioned copending application.

As previously noted, other fan arrangements may be used, with one, two, three, or more fans in a unit. It is not necessary to have the same number of fans in the forward units as in the rear units, the arrangement being made to suit the particular aircraft. For example, it may be desirable to have units of three fans forward and units of two fans at the rear, or the front units could have larger fans than the rear units, or vice versa. In this respect the term "symmetrically disposed about the center of gravity" is intended to refer to the effective thrust of the fan units and the over all result of making the total effective thrust act at or very near the center of gravity, rather than the precise dimensional location of the fan units.

*Operating sequence*

For vertical take-off the fan units are all extended and diverter valves 64 actuated to divert the engine exhaust gas to the fan turbines. Thrust is increased to raise the aircraft to a suitable altitude for transition to forward flight, when the deflection vanes 128 are turned to deflect the fan flow to the rear. As the aircraft moves forward the wings begin to provide aerodynamic lift and, when sufficient lift is developed, the diverter valves 64 can be moved to allow some exhaust to exit from the tailpipes, so increasing forward speed. When the wings are developing sufficient lift to support the aircraft the diverter valves are closed over the side outlets 66 and the fans stop rotating. Deflection vanes 128 and cover doors 130 and 132 are then closed and the fan units retracted to minimize drag and prevent interference with high speed flow to the engines, as in supersonic flight.

For landing the procedure is substantially reversed, the aircraft being decelerated until the fan units can be extended, then the fans operated to provide lifting thrust. For faster deceleration the deflection vanes can be turned to deflect the air flow forward against the direction of motion. In vertical flight mode the aircraft can hover and be maneuvered in the general manner of a helicopter and can be landed in a very small space.

For short run take-off and landing, or for heavily loaded aircraft, the fan air flow can be directed rearwardly to provide forward propulsion by swinging the deflection vanes 128, the ratio of thrust and lift being adjusted to suit particular load and terrain clearance conditions. Alternatively the diverter valves 64 can be set to provide partly propulsive thrust and partly fan thrust. Fan response in very rapid and full lift is quickly obtainable in an emergency.

The crossover power transfer system makes the aircraft exceptionally stable during maneuvers at low speeds or hovering, even if an engine should fail. Except under extreme load conditions one engine will normally provide sufficient fan operating power to maintain flight, or at least retard descent to a safe degree.

It is understood that minor variation from the form of the invention disclosed herein may be made without departure from the spirit and scope of the invention, and that the specification and drawings are to be considered as merely illustrative rather than limiting.

We claim:

1. In a VTOL aircraft: a pair of turbojet engines having exhaust gas conducting tailpipes; four lift fan units each having at least one exhaust gas driven ducted fan operatively mounted therein; said fan units being pivotally mounted on the aircraft each to swing between an inoperative position enclosed within the aircraft and an operative position extending laterally therefrom; actuating means to move said fan units between said two positions; said fan units being disposed substantially symmetrically forward and aft and on opposite sides of the center of gravity of the aircraft; and duct means connecting each of said tailpipes with a specific pair of said fan units diagonally opposed about the center of gravity; each of said fan units has scroll duct means distributing the exhaust gases to drive the fans, said scroll duct having flow guiding vanes therein and a portion of said vanes being movable; said movable vanes have a neutral, partially open position at which gas flow to all said fan units is equal; said movable vanes being adjustable between open and closed positions; and the movable vanes of each of said diagonally opposed pairs of fan units being interconnected to move oppositely, whereby the total gas flow to the pair remains substantially constant.

2. In a VTOL aircraft: a pair of turbojet engines having exhaust gas conducting tailpipes; four lift fan units each having at least one exhaust gas driven ducted fan operatively mounted therein; said fan units being pivotally mounted on the aircraft each to swing between an inoperative position enclosed within the aircraft and an operative position extending laterally therefrom; actuating means to move said fan units between said two positions;

said fan units being disposed substantially symmetrically forward and aft and on opposite sides of the center of gravity of the aircraft; and duct means connecting each of said tailpipes with a specific pair of said fan units diagonally opposed about the center of gravity; doors pivotally mounted on each of said fan units to cover the fans when the units are retracted and form portions of the aircraft's surface; means to open said doors and expose the fans when the fan units are extended; and means to swing said doors selectively in the air flow from the fans to deflect the air flow.

3. In a VTOL aircraft:
a pair of turbojet engines having exhaust gas conducting tailpipes;
four lift generating units mounted on opposite sides of the aircraft and disposed substantially symmetrically about the center of gravity of the aircraft;
each of said units having at least one fan duct therein with a lift fan axially rotatably mounted in the duct, each fan having an exhaust gas driven turbine coupled thereto;
duct means interconnecting each of said engines tailpipes to the turbines in a pair of said lift generating units disposed diagonally about the center of gravity;
said duct means including a primary duct having a diametrical web extending longitudinally therein and defining a pair of channels each coupled to one of said tailpipes;
each of said channels being connected to one of said lift generating units at one end, the channels being transposed and each connected to the diagonally opposite lift generating unit at the other end.

4. A VTOL aircraft according to claim 3, wherein said primary duct has a crossover section in which said web is helically turned substantially 180 degrees to transpose the channels therein.

5. A VTOL aircraft according to claim 3 and including valve means in said web, operable by failure of one of said engines, to interconnect said channels to the remaining engine.

References Cited
UNITED STATES PATENTS

| | | | |
|---|---|---|---|
| 2,441,488 | 5/1948 | Howell | 60—224 |
| 3,033,492 | 5/1962 | Rowe | 244—23 |
| 3,084,888 | 4/1963 | Hertel | 244—23 |
| 3,122,343 | 2/1964 | Leibach et al. | 244—55 X |
| 3,161,374 | 12/1964 | Allred et al. | 244—12 |
| 3,181,810 | 5/1965 | Olson | 24—7 |
| 3,193,217 | 7/1965 | Marchant et al. | 244—23 |
| 3,204,893 | 9/1965 | Shear et al. | 244—76 |
| 3,260,484 | 7/1966 | Riccius | 244—55 |
| 3,302,907 | 2/1967 | Wilde et al. | 244—55 |

FERGUS S. MIDDLETON, *Primary Examiner.*

ALFRED E. CORRIGAN, MILTON BUCHLER, *Examiners.*

B. BELKIN, *Assistant Examiner.*